US012759373B2

(12) United States Patent
Simon

(10) Patent No.: US 12,759,373 B2
(45) Date of Patent: Oct. 13, 2026

(54) ELECTRONIC CONTROL UNIT FOR A HEAT-GENERATING ELECTRICAL DEVICE OF A VEHICLE

(71) Applicant: Gentherm GmbH, Odelzhausen (DE)

(72) Inventor: Dávid Szabolcs Simon, Martonvasar (HU)

(73) Assignee: GENTHERM GMBH, Odelzhausen (DE)

( * ) Notice: Subject to any disclaimer, the term of this patent is extended or adjusted under 35 U.S.C. 154(b) by 923 days.

(21) Appl. No.: 18/081,868

(22) Filed: Dec. 15, 2022

(65) Prior Publication Data

US 2023/0191877 A1 Jun. 22, 2023

(30) Foreign Application Priority Data

Dec. 16, 2021 (DE) ........................ 102021006220.5
Jan. 27, 2022 (DE) ........................ 102022000322.8

(51) Int. Cl.
*B60H 1/22* (2006.01)

(52) U.S. Cl.
CPC ... *B60H 1/2218* (2013.01); *B60H 2001/2246* (2013.01); *B60H 2001/2259* (2013.01)

(58) Field of Classification Search
CPC .......... B60H 1/2218; B60H 2001/2246; B60H 2001/2259
USPC .......................................................... 219/202
See application file for complete search history.

(56) References Cited

U.S. PATENT DOCUMENTS

| | | | | |
|---|---|---|---|---|
| 2012/0204374 A1* | 8/2012 | Shank | B60S 1/50 15/250.05 |
| 2016/0046264 A1* | 2/2016 | Shank | B60S 1/50 219/202 |
| 2016/0368347 A1* | 12/2016 | Pierron | H05B 3/50 |
| 2023/0012887 A1* | 1/2023 | Fournier | B60H 1/2221 |

FOREIGN PATENT DOCUMENTS

| | | |
|---|---|---|
| DE | 19828052 A1 | 12/1999 |
| WO | 2020220005 A1 | 10/2020 |

* cited by examiner

*Primary Examiner* — Steven W Crabb
*Assistant Examiner* — Alba T Rosario-Aponte
(74) *Attorney, Agent, or Firm* — The Dobrusin Law Firm, P.C.

(57) ABSTRACT

An electronic control unit for a heat-generating electrical device of a vehicle, that includes a microcontroller configured to control the operation of the heat-generating electrical device in dependence on a temperature signal of at least one temperature sensor thermally coupled with the heat-generating electrical device; and at least one electronic thermal protection circuit configured to at least temporarily interrupt the control of the operation of the heat-generating electrical device in dependence on the temperature signal of the at least one temperature sensor thermally coupled with the heat-generating electrical device.

12 Claims, 3 Drawing Sheets

ELECTRONIC CONTROL UNIT FOR A HEAT-GENERATING ELECTRICAL DEVICE OF A VEHICLE

CROSS REFERENCE TO RELATED APPLICATIONS

This application claims priority to DE 10 2021 006 220.5, filed on Dec. 16, 2021 and DE 10 2022 000 322.8, filed on Jan. 27, 2022, both of which are expressly incorporated by reference herein for all purposes.

FIELD

These teachings relate to an electronic control unit for a heat-generating electrical device of a vehicle, comprising a microcontroller, which is configured to control the operation of the heat-generating electrical device in dependence on a temperature signal of at least one temperature sensor thermally coupled with the heat-generating electrical device.

BACKGROUND

In the control of in-vehicle heat-generating electrical devices, for example heating devices, electronic safety devices are used in practice, which are able to check whether a control or operating software is being executed. Such electronic safety devices are also referred to as dead man's switch or driver safety device (DSD).

Defects, damage, and errors that have no influence on the execution of the software can, however, cause safety-relevant functional impairments, for example overheating of the heat-generating electrical device, despite the use of appropriate electronic safety devices. This includes, for example, damage to data memories on which a control algorithm is stored. Furthermore, hidden software errors can lead to faulty control, resulting in safety-critical overheating, for example.

SUMMARY

These teachings relate to an electronic control unit for a heat-generating electrical device of a vehicle, comprising a microcontroller, which is configured to control the operation of the heat-generating electrical device in dependence on a temperature signal of at least one temperature sensor thermally coupled with the heat-generating electrical device.

Furthermore, these teachings relate to an in-vehicle control system comprising an in-vehicle heat-generating electrical device and an electronic control unit for the in-vehicle heat-generating electrical device.

Furthermore, these teachings relate to a method for controlling a heat-generating electrical device of a vehicle by means of an electronic control unit, comprising the step of: Controlling the operation of the heat-generating electrical device by a microcontroller of the electronic control unit in dependence on a temperature signal of at least one temperature sensor thermally coupled with the heat-generating electrical device.

The object of these teachings is thus to provide electronic control units for heat-generating electrical devices of a vehicle with a protective function that is as simple and inexpensive as possible.

The object of these teachings is solved by an electronic control unit of the type mentioned herein, wherein the electronic control unit according to these teachings comprises at least one electronic thermal protection circuit, which is configured to at least temporarily interrupt the control of the operation of the heat-generating electrical device by the microcontroller in dependence on a temperature signal of at least one temperature sensor thermally coupled with the heat-generating electrical device.

By using an electronic thermal protection circuit according to these teachings, an inexpensive and simple protection function is provided in the control unit. By outsourcing the protection function from the microcontroller to the thermal protection circuit according to these teachings, simpler microcontrollers can be used for complex applications.

Moreover, by using an electronic thermal protection circuit according to these teachings, increased safety functionalities can be achieved and implemented against situations where system failures may lead to high temperatures caused by the heating element or heat-generating electrical device. For example, the electronic thermal protection circuit may detect certain failures of the temperature sensor(s), such as a sensor that is inoperable and unable to read a temperature value (i.e., stuck-at value), offset, a characteristic change, a full or patrial thermal detachment of the sensor, a wrong sensor used during assembly and installation, etc. The electronic thermal protection circuit may detect certain other failures, such as data errors in temperature conversion or estimation, errors in temperature or voltage calculations, program execution errors without effect on communication of the temperature or voltage values. An additional advantageous outcome of these teachings and circuit arrangement is that only one microcontroller is required. On the other hand, certain other systems that require more than one microcontroller, are more expensive, occupy a larger footprint, add weight and complexity to the system, etc., many of which are not present in the systema according to these teachings.

The heat-generating electrical device is, for example, a heating device, in particular a vehicle seat heating device, a battery heating device, or an engine heating device. The microcontroller and the electronic thermal protection circuit provide control signals preferably to a control unit, which the control unit then uses to set the voltage and/or current provided to the heat-generating electrical device. The control signals of the electronic thermal protection circuit are processed in a prioritized manner at the drive unit for the heat-generating electrical device, said drive unit comprising, for example, a gate driver and/or a power transistor, so that when control signals are present from the microcontroller and from the electronic thermal protection circuit, the setting of the voltage and/or current strength is performed on the basis of the control signals of the electronic thermal protection circuit. Due to the presence of control signals of the electronic thermal protection circuit, the control signals of the microcontroller are not taken into account for driving the heat-generating electrical device. Preferably, the control signals of the electronic thermal protection circuit and the resulting driving of the heat-generating electrical device cannot be overridden or overwritten.

The temperature signal, in dependence on which the microcontroller controls the operation of the heat-generating electrical device, can be a voltage signal. The temperature signal, in dependence on which the electronic thermal protection circuit at least temporarily interrupts the operation of the heat-generating electrical device by the microcontroller, can be a voltage signal.

In a preferred embodiment of the electronic control unit according to these teachings, the electronic thermal protection circuit does not have its own microcontroller and/or is configured to be operated without operating software. Faulty microcontroller control or faulty operation of the microcontroller is thus effectively avoided, which makes the operation of the electronic thermal protection circuit particularly reliable. Since no separate microcontroller is required and no operating software is needed to operate the electronic thermal protection circuit, the electronic thermal protection circuit can be integrated into existing control concepts with particularly little effort. There is no need for extensive application-specific adaptations of the controller architecture and/or the operating software.

In another preferred embodiment, the electronic control unit has one or more temperature sensors, each configured to be thermally coupled with the heat-generating electrical device and to provide a temperature signal relating to the temperature in a temperature detection range, wherein the thermal protection circuit is preferably configured to monitor a temperature signal of a temperature sensor for interrupting the operation of the heat-generating electrical device by the microcontroller, which temperature signal the microcontroller uses to control the operation of the heat-generating electrical device. Thus, in this case, the control of the heat-generating electrical device by the microcontroller and the implementation of the protective function by the electronic thermal protection circuit are based on a temperature signal of the same temperature sensor. The one or more temperature sensors can be designed as thermistors, for example as NTC thermistors or PTC thermistors.

In another preferred embodiment of the electronic control unit according to these teachings, the microcontroller is configured to control the operation of the heat-generating electrical device in dependence on a temperature signal of a first temperature sensor thermally coupled with the heat-generating electrical device. The electronic thermal protection circuit is preferably configured to at least temporarily interrupt the control of the operation of the heat-generating electrical device by the microcontroller in dependence on a temperature signal of a second temperature sensor thermally coupled with the heat-generating electrical device. Thus, in this case, at least two temperature sensors are used, wherein one of the temperature sensors provides temperature signals for the microcontroller control and the signals from the other temperature sensor are monitored by the electronic thermal protection circuit to implement the protective function. The microcontroller can additionally control the operation of the heat-generating electrical device in dependence on the temperature signal of the second temperature sensor thermally coupled with the heat-generating electrical device. Furthermore, the electronic thermal protection circuit can also at least temporarily interrupt the control of the operation of the heat-generating electrical device by the microcontroller in dependence on the temperature signal of the first temperature sensor thermally coupled with the heat-generating electrical device.

The electronic control unit according to these teachings is advantageously further developed in that the electronic thermal protection circuit is configured to monitor the temperature signal with respect to a limit value and to interrupt the operation of the heat-generating electrical device at least temporarily upon detection of exceedance of the limit value. Furthermore, the electronic thermal protection circuit can also be configured to cancel the interruption and resume operation of the heat-generating electrical device upon detection of a limit value underrun or that the temperature value is at or below a limit value, so that the control of the heat-generating electrical device is again performed via the microcontroller. The limit value, whose exceedance or underrun is monitored by the electronic thermal protection circuit, can be a voltage limit value, for example.

An electronic control unit according to these teachings is further advantageous, in which the microcontroller is configured to simulate, at the electronic thermal protection circuit, a limit value exceedance of the temperature signal monitored by the electronic thermal protection circuit to check the function of the electronic thermal protection circuit. The limit value exceedance can be simulated, for example, as part of a check routine which is executed by the microcontroller at regular or irregular intervals to check the function. By simulating the limit value exceedance, the electronic thermal protection circuit is made to believe, for example, that the heat-generating electrical device is overheating, which during proper operation would necessarily lead to an interruption in the voltage supply to the heat-generating electrical device. If the microcontroller detects the interruption of the voltage supply to the heat-generating electrical device caused by the electronic thermal protection circuit, the check of the function is completed without errors, so that it can be assumed that the electronic thermal protection circuit is operating without errors.

In another preferred embodiment of the electronic control unit according to these teachings, the microcontroller is configured to monitor the operating status of the heat-generating electrical device independently of the control of the operation of the heat-generating electrical device. For this purpose, the microcontroller is connected to the heat-generating electrical device by a separate check line, for example, so that an operating status check can be performed even if control of the heat-generating electrical device via the microcontroller is prevented by the thermal protection circuit. Thus, even if control of the heat-generating electrical device by the microcontroller is interrupted, the microcontroller can continue to monitor the operating status of the heat-generating electrical device.

An electronic control unit according to these teachings is further preferred, in which the electronic thermal protection circuit is configured to be supplied with electrical power via the same power supply path as the heat-generating electrical device. For example, the power supply path is a supply path connected to a battery, said path supplying electrical power to both the electronic thermal protection circuit and the heat-generating electrical device. Preferably, the microcontroller is supplied with electrical power via a different power supply path than the electronic thermal protection circuit and the heat-generating electrical device. By supplying electrical power to the electronic thermal protection circuit via the same power supply path as the heat-generating electrical device and supplying electrical power to the microcontroller via a different power supply path than the electronic thermal protection circuit and the heat-generating electrical device, simultaneous failure of the microcontroller and the electronic thermal protection circuit is avoided in the event of an external fault in the power supply, for example, if the voltage is absent or too low, if the voltage is too high, and/or if the voltage is unstable. For example, if a voltage regulator supplies 12 V instead of 5 V due to a defect, this would damage all circuits connected to the voltage regulator. If the electronic thermal protection circuit is connected to the battery and the microcontroller is connected to the 5 V power supply, this defect would only damage the microcontroller and the electronic thermal protection circuit can still interrupt the operation of the heat-generating electrical device. On the other hand, the failures associated with the battery do not cause a safety-relevant malfunction in either the microcontroller or the electronic thermal protection circuit. Thus, if the electronic thermal protection circuit is powered by the battery, a malfunction of the internal 5 V voltage regulator will not affect the operation of the electronic thermal protection circuit. A voltage regulator is required to operate the microcontroller, whereas the electronic thermal protection circuit can also be operated at a higher voltage without any problems.

In another preferred embodiment, the electronic control unit according to these teachings has a first electronic thermal protection circuit and a second electronic thermal protection circuit. The first electronic thermal protection circuit is preferably configured to at least temporarily interrupt the control of the operation of the heat-generating electrical device by the microcontroller in dependence on a temperature signal of a first temperature sensor thermally coupled with the heat-generating electrical device. The second electronic thermal protection circuit is preferably configured to at least temporarily interrupt the control of the operation of the heat-generating electrical device by the microcontroller in dependence on a temperature signal of a second temperature sensor thermally coupled with the heat-generating electrical device. The microcontroller can use the temperature signals of the first temperature sensor and of the second temperature sensor to control the heat-generating electrical device, provided that the microcontroller control is not interrupted by the first electronic thermal protection circuit and/or the second electronic thermal protection circuit.

The electronic control unit according to these teachings is advantageously further developed in that the microcontroller and the electronic thermal protection circuit are arranged in a common housing of the control unit. The housing in which the microcontroller and the electronic thermal protection circuit are arranged can be a control unit housing, for example. Alternatively or additionally, the microcontroller and the electronic thermal protection circuit can be arranged on a common printed circuit board of the control unit. The microcontroller and the electronic thermal protection circuit can be arranged as surface-mounted electronic components on the printed circuit board.

The object of these teachings is further solved by an in-vehicle control system of the type mentioned at the outset, wherein the electronic control device of the in-vehicle control system according to these teachings is designed according to one of the embodiments described above. With respect to the advantages and modifications of the control system according to these teachings, reference is first made to the advantages and modifications of the electronic control unit according to these teachings.

In a preferred embodiment of the in-vehicle control system according to these teachings, the in-vehicle heat-generating electrical device is a heating device, in particular a vehicle seat heating device, a battery heating device or an engine heating device. Thus, the in-vehicle control system can be, for example, a control system for a vehicle seat heating device, for a battery heating device, or for an engine heating device.

The object of these teachings is further solved by a method of the type mentioned at the outset, wherein, within the scope of the method according to these teachings, the control of the operation of the heat-generating electrical device by the microcontroller via at least one electronic thermal protection circuit is at least temporarily interrupted in dependence on a temperature signal of at least one temperature sensor thermally coupled with the heat-generating electrical device. The method according to these teachings is preferably carried out by means of an electronic control unit pursuant to one of the embodiments described above. With respect to the advantages and modifications of the method according to these teachings, reference is thus also made to the advantages and modifications of the electronic control unit according to these teachings.

These teachings do not necessarily aim to detect and correct microcontroller failure, but instead provide protection against physical parameter issues in the system (i.e., against heater issues). The system may then use the parameter issues to detect malfunctions in the system that may result in high temperatures above a predetermined or desired level. Moreover, the protection circuit utilizes the same temperature sensor(s) and switching element as the normal temperature regulating system, which thus simplifies the system and reduces cost and complexity by not requiring one or more additional, dedicated temperature sensors.

These teachings provide an electronic control unit for a heat-generating electrical device of a vehicle, comprising: a temperature sensor thermally coupled to the heat-generating electrical device; a microcontroller configured to control an operation of the heat-generating electrical device depending on a temperature signal from the temperature sensor; and an electronic thermal protection circuit configured to at least temporarily interrupt the control of the operation of the heat-generating electrical device depending on the temperature signal from the temperature sensor. The electronic thermal protection circuit is free of its own microcontroller and/or is configured to be operated without operating software. The temperature sensor is configured to provide the temperature signal relating to a temperature in a temperature detection range, the thermal protection circuit is configured to monitor the temperature signal and then interrupt the operation of the heat-generating electrical device if the temperature signal is at or above a predetermined threshold. The electronic control unit comprises a second temperature sensor that is thermally coupled with the heat-generating electrical device, and the microcontroller is configured to control the operation of the heat-generating electrical device in dependence of the temperature signal from the temperature sensor, and the electronic thermal protection circuit is configured to at least temporarily interrupt the control of the operation of the heat-generating electrical device in dependence on a temperature signal of the second temperature sensor. The electronic thermal protection circuit is configured to monitor the temperature signal with respect to a limit value and to interrupt the operation of the heat-generating electrical device at least temporarily upon detection and determination that the temperature signal meets or exceeds a predetermined limit value. The microcontroller is configured to periodically simulate, at the electronic thermal protection circuit, the temperature signal meeting or exceeding the predetermined limit value without the temperature signal actually meeting or exceeding the predetermined limit value, to check a function of the electronic thermal protection circuit. The microcontroller is configured to monitor an operating status of the heat-generating electrical device independently of the control of the operation of the heat-generating electrical device. The electronic thermal protection circuit is configured to be supplied with electrical power via the same power supply path that supplies power to the heat-generating electrical device. The electronic thermal protection circuit comprises a first electronic thermal protection circuit and a second electronic thermal protection circuit; the first electronic thermal protection circuit is configured to at least temporarily interrupt the control of the operation of the heat-generating electrical device in dependence on the temperature signal of a first temperature sensor that is thermally coupled with the heat-generating electrical device; and the second electronic thermal protection circuit is configured to at least temporarily interrupt the control of the operation of the heat-generating electrical device in dependence on a temperature signal of a second temperature sensor that is thermally coupled with the heat-generating electrical device. The microcontroller and the electronic thermal protection circuit are arranged in a common housing of the electronic control unit and/or on a common printed circuit board of the electronic control unit.

These teachings provide a method of controlling the heat-generating electrical device of the vehicle the electronic control unit, the method comprises: controlling the operation of the heat-generating electrical device by the microcontroller of the electronic control unit in dependence of the temperature signal of the temperature sensor thermally coupled with the heat-generating electrical device; the control of the operation of the heat-generating electrical device is at least temporarily interrupted in dependence on the temperature signal of the temperature sensor thermally coupled with the heat-generating electrical device. The method comprises simulating, with the microcontroller, the temperature signal meeting or exceeding the predetermined limit value without the temperature signal actually meeting or exceeding the predetermined limit value, to check a function of the electronic thermal protection circuit. The simulating step takes place without interrupting a power supply to the heat-generating electrical device.

Those skilled in the art will appreciate that the teachings herein provide numerous advantages and benefits over the state of the art. For example, the teachings herein do not necessarily aim to detect and correct microcontroller failures resulting in data integrity or software flow or temperature sensor measurement errors, but instead provides protection based on physical parameters of the overall system (i.e., temperature of the heater) and uses these parameters to detect any malfunction which would result in high temperatures. Moreover, the safety shut-off circuitry according to these teachings uses the same temperature sensor and switching element as the normal thermal regulation but the complete redundancy of each element is still kept without the need of using additional temperature sensors or switching elements (the existing elements are sufficient for achieving the desired safety level). Advantages that may be gleaned from these teachings by those having ordinary skill in the art include but are not limited to: higher level of safety achieved, a more cost-efficient solution (i.e., only one data processing device used), more compact design. (i.e., all electronic components can be integrated in one small circuit), more detailed solution (i.e., power distribution network described, failure mode detection and prevention described for each failure.)

BRIEF DESCRIPTION OF THE DRAWINGS

In the following, preferred embodiments of these teachings are explained and described in more detail with reference to the accompanying drawings. The Figures show.

DETAILED DESCRIPTION

Figure 1:
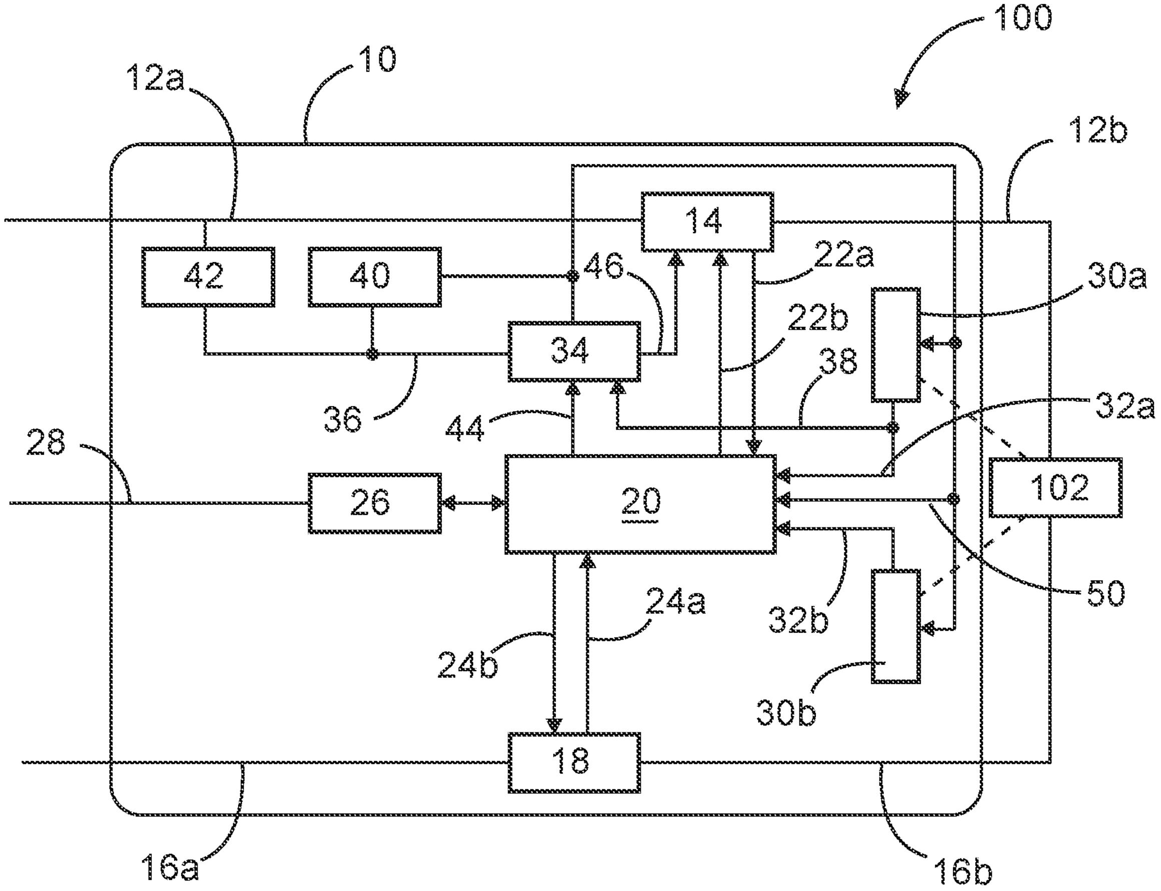
FIG. 1 shows a schematic representation of an embodiment of the control system according to these teachings.

FIG. 1 shows an in-vehicle control system 100. The in-vehicle control system 100 comprises an in-vehicle heat-generating electrical device 102 and an electronic control unit 10. The in-vehicle heat-generating electrical device 102 may be designed as a heating device and the in-vehicle heat-generating electrical device 102 can be controlled by or with the electronic control unit 10.

The in-vehicle heat-generating electrical device 102 may be a vehicle seat heating device. However, the control unit 10 can also be used to control a battery heating device or an engine heating device.

The control unit 10 may include a drive unit 14, which is connected to a power source, for example a battery, via an electrical conductor 12*a*. The drive unit 14 provides a specific voltage and/or a specific current to the heat-generating electrical device 102 so that the intended operation of the heat-generating electrical device 102 is implemented. The drive unit 14 can comprise, for example, a gate driver and/or a power transistor and is connected to the heat-generating electrical device 102 via the electrical conductor 12*b*.

The heat-generating electrical device 102 is connected to the electrical conductor 16*a* on the ground-side via the electrical conductor 16*b* and the drive unit 18.

The electronic control unit 10 comprises a microcontroller 20. The microcontroller 20 is configured to control operation of the heat-generating electrical device 102. The microcontroller 20 is connected to the drive unit 14 via the signal-conducting connections 22*a*, 22*b* and to the drive unit 18 via the signal-conducting connections 24*a*, 24*b*. The microcontroller 20 can monitor the power state of the drive unit 14 via the signal-conducting connection 22*a*. The microcontroller 20 can provide control signals to the drive unit 14 via the signal-conducting connection 22*b*, so that the voltage and/or current provided to the heat-generating electrical device 102 can be set accordingly via the drive unit 14. The microcontroller 20 uses the signal-conducting connection 24*a* to query the operating status of the drive unit 18. The microcontroller 20 can drive the drive unit 18 via the signal-conducting connection 24*b*.

Control instructions can be communicated to the microcontroller 20 from a vehicle occupant or an operator side via a signal-conducting connection 28 and an interface circuit 26.

The electronic control unit 10 further comprises at least one or two or more than two temperature sensors 30*a*, 30*b* designed as NTC thermistors, which are thermally coupled to or with the heat-generating electrical device 102. The temperature sensors 30*a*, 30*b* provide a temperature signal or temperature reading relating to the temperature in a temperature detection range. The temperature signals are voltage signals which are provided to the microcontroller 20 via the signal-conducting connections 32*a*, 32*b*. The control unit 10 further comprises a 5 volt supply line 50, which is connected to the temperature sensors 30*a*, 30*b* and the microcontroller 20. The microcontroller 20 can interpret the voltage signals coming from the temperature sensors 30*a*, 30*b*, by taking into account the voltage on the supply line 50, to carry out a temperature determination. The microcontroller 20 controls the operation of the heat-generating electrical device 102 in dependence on the temperature signals from the temperature sensors 30*a*, 30*b* that are thermally coupled with the heat-generating electrical device 102.

The electronic control unit 10 further comprises an electronic thermal protection circuit 34 configured to at least temporarily interrupt the control and./or the operation of the heat-generating electrical device 102 by the microcontroller 20 depending on or in dependence on the temperature signal from the temperature sensor 30*a*. The temperature signal from the temperature sensor 30*a* that is processed by the thermal protection circuit 34 is a voltage signal. The voltage signal is transmitted via the signal-conducting connection 38 between the temperature sensor 30*a* and the thermal protection circuit 34. The electronic thermal protection circuit 34 does not have its own microcontroller. The electronic thermal protection circuit 34 is configured to operate without operating software. Via the signal-conducting connection 46 extending between the thermal protection circuit 34 and the drive unit 14, the thermal protection circuit 34 can deactivate the drive unit 14 or can drive the drive unit 14 in such a way that the operation of the heat-generating electrical device 102 is changed or interrupted.

The thermal protection circuit 34 is configured to monitor the temperature signal from the temperature sensor. The thermal protection circuit 34 is configured to monitor the temperature signal with respect to a limit value. The thermal protection circuit 34 is configured to monitor the temperature signal and compare the temperature signal to a limit value. If the thermal protection circuit 34 detects or determines a temperature signal from the temperature sensor meets or exceeds a limit value, then the thermal protection circuit 34 can interrupt or temporarily interrupt or stop the operation of the heat-generating electrical device 102. The thermal protection circuit 34 can cancel the interruption of the operation of the heat-generating electrical device or initiate or resume operation of the heat-generating electric device 102 if/when there is a subsequent detection or determination of a temperature value at or below a predetermined value or if there is a limit value underrun or the temperature signal is at or below a predetermined threshold, so that the microcontroller 20 resume or again performs the control of the heat-generating electrical device 102.

The microcontroller 20 is connected to the thermal protection circuit 34 via the signal-conducting connection 44. Via this connection 44, the microcontroller 20 can monitor the operating status of the drive unit 18 independently of the control of the operation of the heat-generating electrical device 102. Via this connection 44, the microcontroller 20 can perform a functional check of the electronic protection circuit 34. To check the operation of the electronic thermal protection circuit 34, the microcontroller 20 simulates a limit value exceedance of the temperature signal monitored by the electronic thermal protection circuit 34. During proper operation of the thermal protection circuit 34, the drive unit 14 would have to interrupt the power supply to the heat-generating electrical device 102. The microcontroller 20 can check this via the signal-conducting connection 22*a*, without interrupting the power supply to the heat-generating electrical device 102. Such a check without there being an actual failure provides an advantageous maintenance check to ensure the system is functioning properly. If the system detects a temperature drift, then the system can call for repair before the system is completely deactivated or failure occurs.

The control device 10 further comprises a voltage regulator 40 connected to the conductor 12*a*, wherein a rectifier including a fusible element 42 is arranged between the conductor 12*a* and the voltage regulator 40. The voltage regulator 40 applies a voltage of 5 volts to the supply line 50. The rectifier including the fusible element 42 is further connected to the thermal protection circuit 34 via the supply line 36.

The electronic thermal protection circuit 34 is supplied with electrical power via the same power supply path as the heat-generating electrical device 102. The microcontroller 20 is supplied with electrical power via a different power supply path than the electronic thermal protection circuit 34 and the heat-generating electrical device 102.

Figure 2:
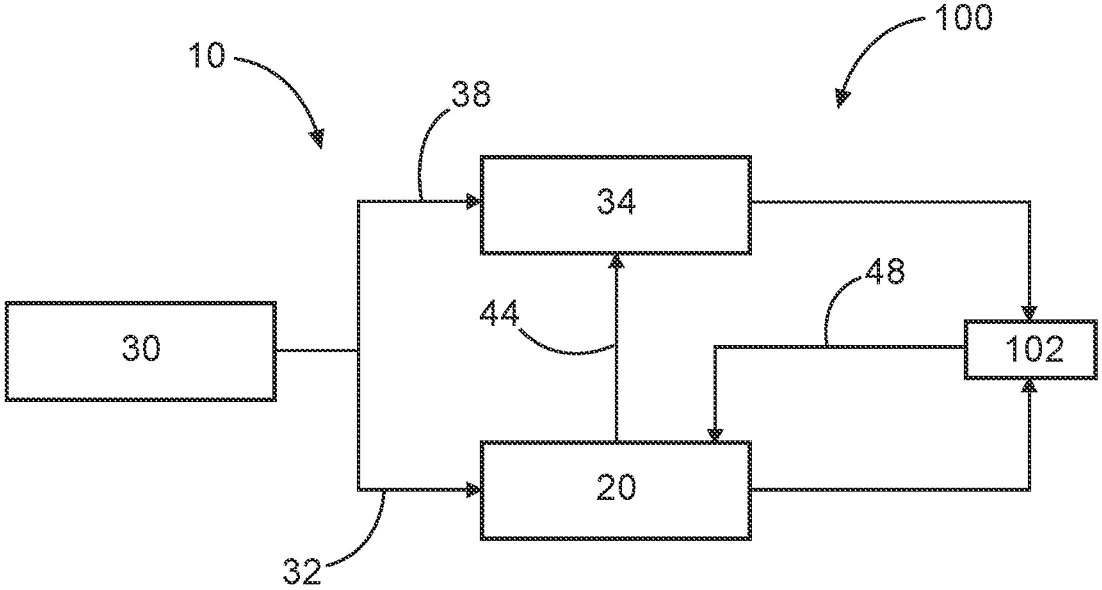
FIG. 2 shows a schematic representation of a further embodiment of the control system according to these teachings.

FIG. 2 shows a control system 100 comprising a temperature sensor 30. The temperature sensor 30 provides a temperature signal to the microcontroller 20 via the signal-conducting connection 32. The temperature signal is further provided to the thermal protection circuit 34, namely via the signal-conducting connection 38. Provided that the temperature detected by the temperature sensor 30 does not exceed a predetermined temperature limit value, then the heat-generating electrical device 102 is controlled via the microcontroller 20. As soon as the temperature limit value is exceeded, however, the thermal protection circuit interrupts, or ensures an interruption of, the operation of the heat-generating electrical device 102.

The microcontroller 20 can check the operating status of the heat-generating electrical device 102 via the signal-conducting connection 48. In this respect, a functional check of the electronic thermal protection circuit 34 can be performed via the signal-conducting connection 44, in which the microcontroller 20 of the electronic thermal protection circuit 34 simulates a temperature limit value exceedance and then checks the operating status of the heat-generating electrical device 102 via the connection 48.

Figure 3:
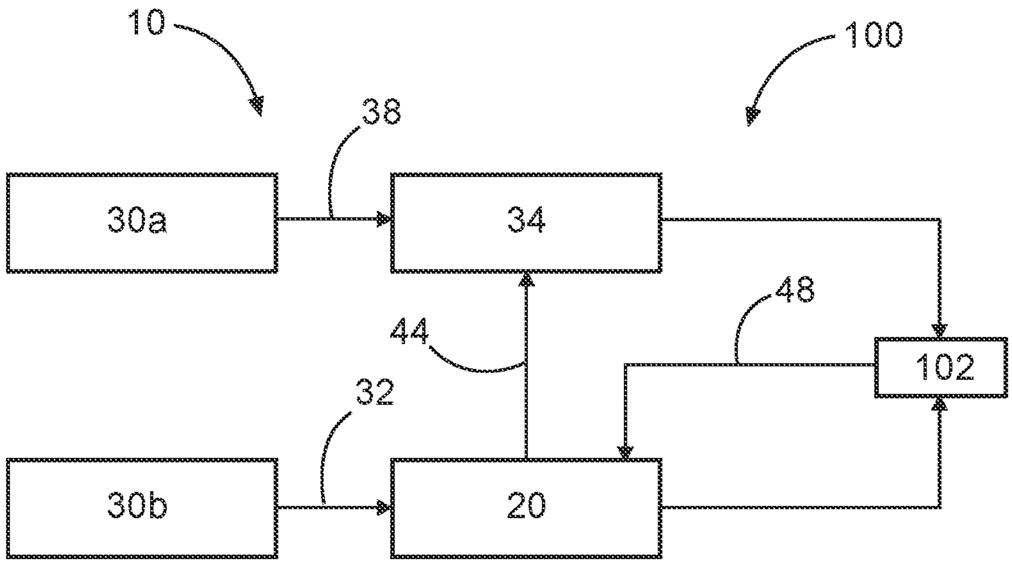
FIG. 3 shows a schematic representation of a further embodiment of the control system according to these teachings.

FIG. 3 shows a control system 100 in which the microcontroller 20 is connected to the temperature sensor 30*b* via the signal-conducting connection 32. The thermal protection circuit 34 is connected to the temperature sensor 30*a* via the signal-conducting connection 38. Thus, the control of the operation of the heat-generating electrical device 102 via the microcontroller 20 is based on the temperature values of the temperature sensor 30*b*. The interruption of the operation of the heat-generating electrical device 102 by means of the thermal protection circuit 34 is based on the signal of the temperature sensor 30*a*. In this respect, the microcontroller 20 and the thermal protection circuit 34 use different temperature signals.

Figure 4:
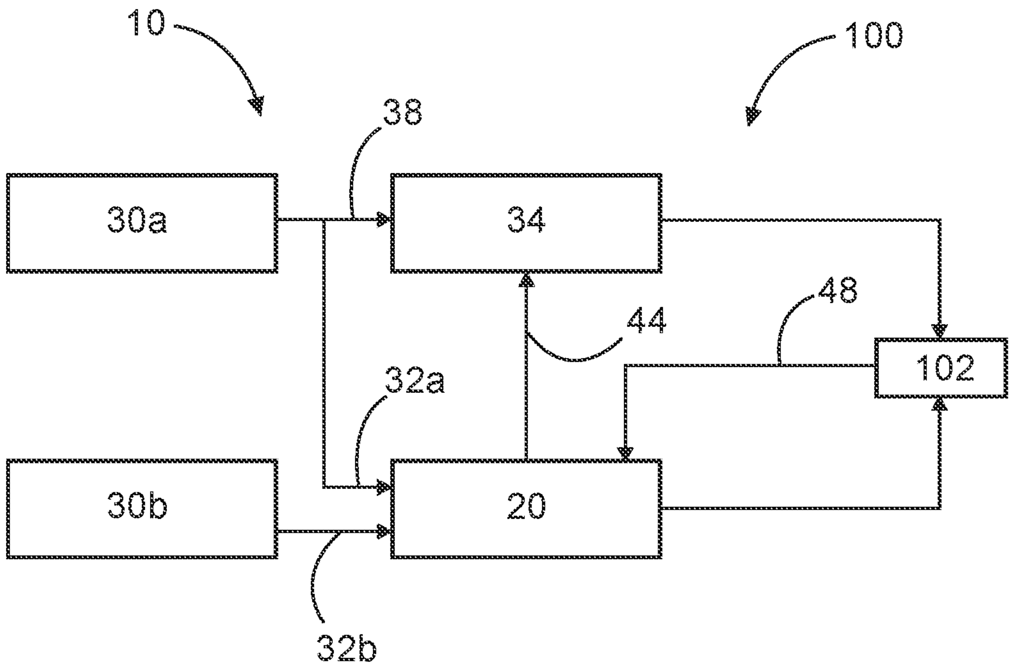
FIG. 4 shows a schematic representation of a further embodiment of the control system according to these teachings.

In the embodiment of the control system 100 shown in FIG. 4, the microcontroller 20 takes into account the temperature signal of both temperature sensors 30*a*, 30*b*. For this purpose, the microcontroller 20 is connected to the temperature sensor 30*a* via the signal-conducting connection 32*a* and to the temperature sensor 30*b* via the signal-conducting connection 32*b*.

The thermal protection circuit 34 only takes into account the temperature signal of the temperature sensor 30*a*.

Figure 5:
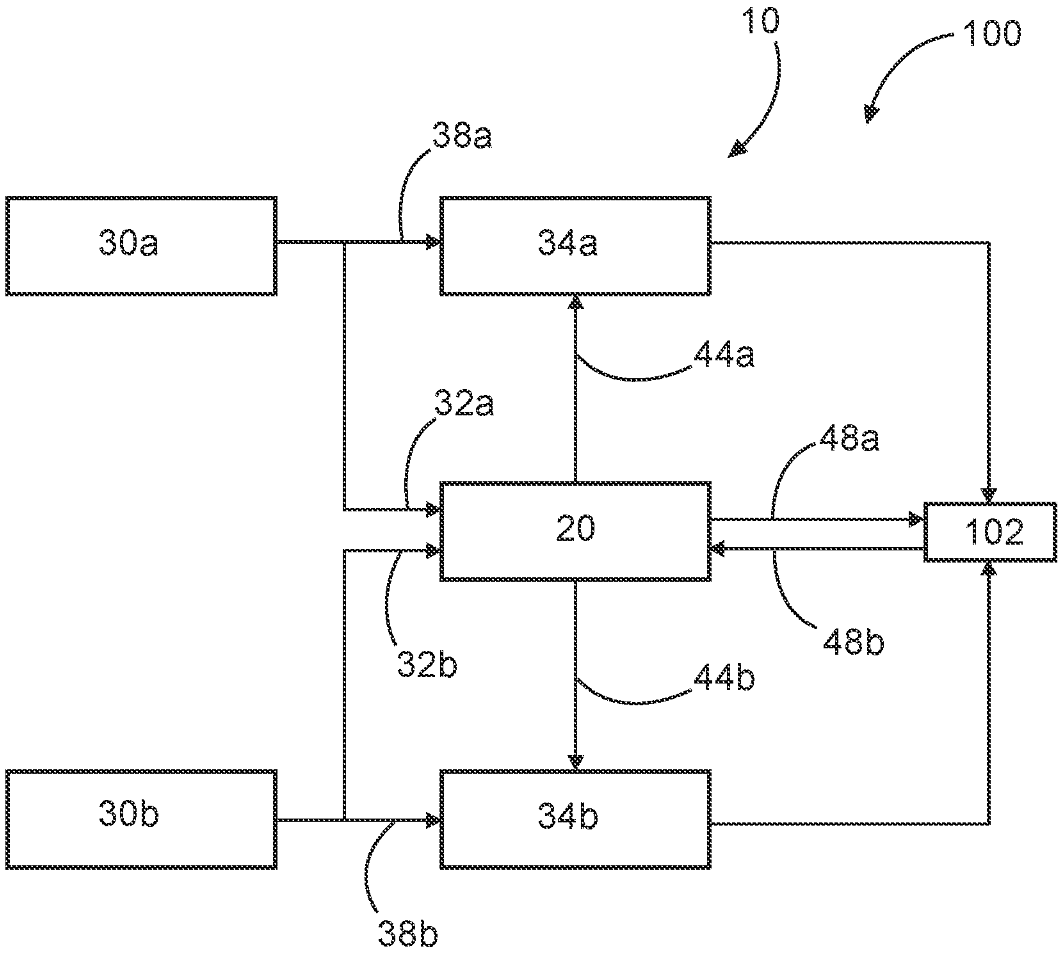
FIG. 5 shows a schematic representation of a further embodiment of the control system according to these teachings.

FIG. 5 shows an embodiment of the control system 100 in which the control unit 10 has two thermal protection circuits 34*a*, 34*b*. The signal-conducting connections 44*a*, 44*b* between the microcontroller 20 and the thermal protection circuits 34*a*, 34*b* and the signal-conducting connections 48*a*, 48*b* between the microcontroller 20 and the heat-generating electrical device 102 now serve for the functional check of the electronic thermal protection circuits 34*a*, 34*b*.

The thermal protection circuit 34*a* is connected to the temperature sensor 30*a* via the signal-conducting connection 38*a* and takes into account only the temperature signal of the temperature sensor 30*b*. The thermal protection circuit 34*b* is connected to the temperature sensor 30*b* via the signal-conducting connection 38*b* and takes into account only the temperature signal of the temperature sensor 30*b*. The microcontroller 20 is connected to both temperature sensors 30*b*, 30*b* via the signal-conducting connection 32*a*, 32*b* so that the microcontroller 20 can take into account the temperature signals of both temperature sensors 30*a*, 30*b* in the control of the operation of the heat-generating electrical device.

REFERENCE NUMBERS

10 Control unit
12*a*, 12*b* Conductor
14 Drive unit
16*a*, 12*b* Conductor
18 Drive unit
20 Microcontroller
22*a*, 22*b* Signal-conducting connections
Signal-conducting connections 24*a*, 24*b*
26 Interface circuit
28 Signal-conducting connection
30, 30*a*, 30*b* Temperature sensors
32, 32*a*, 32*b* Signal-conducting connections
34, 34*a*, 34*b* Thermal protection circuits
36 Supply line
38, 38*a*, 38*b* Signal-conducting connections
40 Voltage regulator
42 Rectifier & fusible element
44, 44*a*, 44*b* Signal-conducting connections
46 Signal-conducting connection
48, 48*a*, 48*b* Signal-conducting connections
50 Supply line
100 Control system
102 Heat-generating electrical device

The invention claimed is:

1. An electronic control unit for a heat-generating electrical device of a vehicle, comprising:

a temperature sensor thermally coupled to the heat-generating electrical device;

a microcontroller configured to control an operation of the heat-generating electrical device depending on a temperature signal from the temperature sensor; and an electronic thermal protection circuit configured to at least temporarily interrupt the operation of the heat-generating electrical device depending on the temperature signal from the temperature sensor;

wherein the electronic thermal protection circuit is configured to monitor the temperature signal and to interrupt the operation of the heat-generating electrical device at least temporarily upon detection and determination that the temperature signal meets or exceeds a predetermined limit value, and wherein the microcontroller is configured to periodically simulate, at the electronic thermal protection circuit, the temperature signal meeting or exceeding the predetermined limit value without the temperature signal actually meeting or exceeding the predetermined limit value to check a function of the electronic thermal protection circuit.

2. The electronic control unit according to claim 1, wherein the electronic thermal protection circuit is free of its own microcontroller and/or is configured to be operated without operating software.

3. The electronic control unit according to claim 1, wherein the temperature sensor is configured to provide the temperature signal relating to a temperature in a temperature detection range, wherein the electronic thermal protection circuit is configured to monitor the temperature signal and then interrupt the operation of the heat-generating electrical device if the temperature signal is at or above a predetermined threshold.

4. The electronic control unit according to claim 3, wherein the electronic control unit comprises a second temperature sensor that is thermally coupled with the heat-generating electrical device, and wherein the microcontroller is configured to control the operation of the heat-generating electrical device in dependence of the temperature signal from the temperature sensor, and the electronic thermal protection circuit is configured to at least temporarily interrupt the control of the operation of the heat-generating electrical device in dependence on a temperature signal of the second temperature sensor.

5. The electronic control unit according to claim 1, wherein the microcontroller is configured to monitor an operating status of the heat-generating electrical device independently of the control of the operation of the heat-generating electrical device.

6. The electronic control unit according to claim 1, wherein the electronic thermal protection circuit is configured to be supplied with electrical power via the same power supply path that supplies power to the heat-generating electrical device.

7. The electronic control unit according to claim 1, wherein the electronic thermal protection circuit comprises a first electronic thermal protection circuit and a second electronic thermal protection circuit, wherein the first electronic thermal protection circuit is configured to at least temporarily interrupt the control of the operation of the heat-generating electrical device in dependence on the temperature signal of a first temperature sensor that is thermally coupled with the heat-generating electrical device; and wherein the second electronic thermal protection circuit is configured to at least temporarily interrupt the control of the operation of the heat-generating electrical device in dependence on a temperature signal of a second temperature sensor that is thermally coupled with the heat-generating electrical device.

8. The electronic control unit according to claim 1, wherein the microcontroller and the electronic thermal protection circuit are arranged in a common housing of the electronic control unit and/or on a common printed circuit board of the electronic control unit.

9. An in-vehicle control system comprising an in-vehicle heat-generating electrical device; and the electronic control unit according to claim 1.

10. The in-vehicle control system according to claim 9, wherein the in-vehicle heat-generating electrical device is a heating device, a vehicle seat heating device, a battery heating device, or an engine heating device.

11. A method of controlling the electronic control unit according to claim 1, wherein the method comprises:

controlling the operation of the heat-generating electrical device by the microcontroller of the electronic control unit in dependence of the temperature signal of the temperature sensor thermally coupled with the heat-generating electrical device;

wherein the controlling of the operation of the heat-generating electrical device is at least temporarily interrupted in dependence on the temperature signal of the temperature sensor thermally coupled with the heat-generating electrical device, wherein the method comprises simulating with the microcontroller, the temperature signal meeting or exceeding the predetermined limit value without the temperature signal actually meeting or exceeding the predetermined limit value, to check a function of the electronic thermal protection circuit.

12. The method according to claim 11, wherein the simulating step takes place without interrupting a power supply to the heat-generating electrical device.

* * * * *